US012780200B2

(12) United States Patent
Zhang et al.

(10) Patent No.: US 12,780,200 B2
(45) Date of Patent: Nov. 3, 2026

(54) METHOD AND A SYSTEM FOR DETERMINING A TRAJECTORY FOR A VEHICLE

(71) Applicant: HUAWEI TECHNOLOGIES CO., LTD., Shenzhen (CN)

(72) Inventors: Weize Zhang, Maple (CA); Behzad Khamidehi, Toronto (CA); Mohammed Elmahgiubi, Richmond (CA); Zhitao Wang, Beijing (CN); Kasra Rezaee, Kitchener (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 18/745,181

(22) Filed: Jun. 17, 2024

(65) Prior Publication Data

US 2025/0381958 A1 Dec. 18, 2025

(51) Int. Cl.
*B60W 30/165* (2020.01)
*B60W 30/095* (2012.01)
*B60W 60/00* (2020.01)

(52) U.S. Cl.
CPC ...... *B60W 30/165* (2013.01); *B60W 30/0956* (2013.01); *B60W 60/0015* (2020.02); *B60W 2554/80* (2020.02); *B60W 2720/106* (2013.01)

(58) Field of Classification Search
CPC ........... B60W 30/165; B60W 30/0956; B60W 60/0015; B60W 2554/80; B60W 2720/106
See application file for complete search history.

(56) References Cited

U.S. PATENT DOCUMENTS

| | | | | |
|---|---|---|---|---|
| 11,801,864 | B1 * | 10/2023 | Arora | G06N 3/084 |
| 2021/0276547 | A1 * | 9/2021 | Narayanan | G06F 18/24137 |
| 2022/0227391 | A1 * | 7/2022 | Wang | B60W 30/09 |
| 2023/0047336 | A1 * | 2/2023 | Iglesias | B60W 50/0097 |

(Continued)

OTHER PUBLICATIONS

Hu et al., Model-based imitation learning for urban driving, 36th Conference on Neural Information Processing Systems, NeurIPS, 2022.

(Continued)

*Primary Examiner* — Khoi H Tran
*Assistant Examiner* — Tristan J Greiner
(74) *Attorney, Agent, or Firm* — BCF LLP

(57) ABSTRACT

A method and an apparatus for determining a target trajectory for a vehicle. The method comprises determining a respective score for each one of a plurality of trajectory candidates for the vehicle from a current ego pose to a target ego position and for each trajectory candidate, generating one or more adjustment scores, the one or more adjustment score. The method further comprises determining, based on the respective score and the plurality of adjustment scores, a modified respective score for each trajectory candidate, ranking the plurality of trajectory candidates according to the modified respective scores and selecting, from the ranked trajectory candidates, a top trajectory candidate as being the target trajectory for navigating the vehicle from the current to the target ego positions. This may help address the problem of causal confusion, thereby allowing for better safety of the trajectories.

21 Claims, 7 Drawing Sheets

Desired following location: t seconds behind the front vehicle

(56) References Cited

U.S. PATENT DOCUMENTS

2024/0025395 A1 * 1/2024 Omari .................. B60W 30/09

OTHER PUBLICATIONS

Zhai et al., Rethinking the open-loop evaluation of end-to-end autonomous driving in nuScenes, Oct. 22, 2023.
Zhao et al., TNT: Target-driveN Trajectory Prediction, 4th Conference on Robot Learning, Aug. 2020.
International Search Report and Written Opinion issued in Co-pending application No. PCT/CN2025/098040 on Aug. 25, 2025.

* cited by examiner

METHOD AND A SYSTEM FOR DETERMINING A TRAJECTORY FOR A VEHICLE

FIELD

The present technology relates broadly to motion planning and, more specifically, to a method and system for determining a target trajectory for an autonomous vehicle.

BACKGROUND

An end-to-end motion planner is an algorithm for generating trajectories for a given vehicle, such as a semi-autonomous or fully autonomous vehicle, also referred to herein as a self-driving car, (SDC). An end-to-end motion planner may use, for example, past and current poses of the vehicle (generally referred to as ego poses), poses of surrounding objects, history motion information of the vehicle as well as data of surroundings of the vehicle, including, without limitation: lane topology, location and object classes of surrounding objects such as traffic lights, signs, guardrails, pedestrians, and the like. As a result, the end-to-end motion planner can be configured to generate a future trajectory of the vehicle from the current ego pose to a target ego position thereof.

There are certain end-to-end motion planners known in the prior art.

For example, an article authored by Zhao et al., entitled "*TNT: Target-driveN Trajectory Prediction*," and published at arxiv.org on Aug. 19, 2020, discloses a target-driven trajectory prediction (TNT) framework. Briefly, the TNT has three stages which are trained end-to-end. It first predicts an agent's potential target states T steps into the future, by encoding its interactions with the environment and the other agents. Further, the TNT generates trajectory state sequences conditioned on targets. A final stage of the TNT framework estimates trajectory likelihoods, and a final compact set of trajectory predictions is selected.

As another example, an article authored by Zhai et al., entitled "*Rethinking the Open-Loop Evaluation of End-to-End Autonomous Driving in nuScene*," published at arxiv.org on May 17, 2023, discloses re-evaluating certain evaluation metrics, such as L2 error and collision rate, and determining whether they accurately measure the superiority of different methods. Specifically, the paper discloses an MLP-based method that takes raw sensor data (e.g., past trajectory, velocity, etc.) as input and directly outputs the future trajectory of the ego vehicle, without using any perception or prediction information such as camera images or LiDAR. Both of these articles are hereby incorporated by reference in their entirety.

However, the prior art approaches do not address the problem of causal confusion. In the context of the present specification the term "causal confusion" denotes an incorrectly determined cause for a given effect associated with the movement of the autonomous vehicle. For example, the motion planner can determine that the autonomous vehicle is currently slowing down due to: (1) a front vehicle travelling in front of the autonomous vehicle at a lower speed, or (2) due to determining that the autonomous vehicle is slowing down in a previous time frame. Thus, if the motion planner determines the wrong cause of the deceleration of the autonomous vehicle, it may result in overfitting of the planner to a specific scenario, preventing the end-to-end motion planner to generalize to multiple different scenarios.

In other words, the above approaches do not allow generalizing to closed-loop performance of the end-to-end motion planner, that is, do not allow achieving desired results in terms of average displacement error (ADE) and final displacement error (FDE). This may cause accidents of the vehicle travelling along the so generated trajectories.

Thus, there is a need in the art that would address the identified technical problem.

SUMMARY

It is an object of the present technology to ameliorate at least one inconvenience associated with the prior art.

With reference to FIG. 2, there is depicted a prior art end-to-end motion planner 200, which includes: (i) a motion planning model 202, configured to generate kinematic increments (such as angles for turns and displacements between points) for each of a plurality of trajectory candidates; (ii) a kinematic model 204, configured to determine kinematic parameters (such as speed, acceleration, and the like) through integrating kinematic increments; and (iii) a scoring model 206, configured to score each one of the plurality of trajectory candidates.

Each one of the motion planning, kinematic, and scoring models 202, 204, and 206 can be trained to minimize a difference between training trajectory candidates, given training kinematic parameters associated therewith, and a ground-truth trajectory, that is, that, which the vehicle is currently following.

The end-to-end motion planner 200 can be configured to: (i) receive input data 208, including the current ego pose of the vehicle, the history motion information, and the information of the vehicle's surroundings; (ii) vectorize the input data 208 using a suitable vector embedding algorithm 210 (such as a VectorNet embedding algorithm); (iii) receive data of a target ego position (x,y) for the vehicle at the target selection model 212; and (iv) based on the vectorized input data and the data of the target ego position, generate, using the motion planning and kinematic models 202, 204, a plurality of trajectory candidates defined, for each moment in time by a respective set of motion parameters ($\Delta^2$ s, $\Delta\theta$), from the current ego pose (at a current moment in time) to the target ego position (for a target moment in time) of the vehicle. The plurality of trajectory candidates can further be ranked in accordance with scores generated by the scoring model 206. Further, the end-to-end motion planner 200 can be configured to select the top-ranked trajectory candidate as the target trajectory for the vehicle from the current ego pose to target ego positions thereof.

However, as mentioned above, such an architecture of the prior art end-to-end motion planner 200 can be prone to the problem of causal confusion. More specifically, as the input data 208 includes multiple parameters, the prior art end-to-end motion planner 200, such as the one depicted in FIG. 2, can generate candidate trajectories without considering certain input-output correlations. For example, the end-to-end planner 200 can generate the trajectory candidates considering only the history motion information (that is, past positions of the vehicle). In another example, the prior art end-to-end motion planner 200 may determine current speed values for the vehicle travelling along one of the so generated trajectory candidates based on current speed values of lead vehicles, that is, those, travelling immediately ahead of the vehicle. As a result, when determining the target trajectory for the vehicle, the prior art end-to-end motion planner 200 can be biased towards only a single input. Failing to consider other objects or situations in the surrounding of the vehicle may cause elevated risks of accidents associated with the vehicle.

In order to tackle this technical problem, additional (or otherwise auxiliary) scores for each of the generated trajectory candidates may need to be considered. More specifically, the developers have devised adjustment scores that allow real-world situations to be taken into account, including, for example, current locations of the surrounding objects and their kinematic parameters as the vehicle travels along the given trajectory candidate. This may help address the problem of causal confusion, thereby allowing for better safety of the trajectories.

More specifically, in accordance with a first broad aspect of the present technology, there is provided a computer-implemented method for determining a target trajectory for a vehicle. The method comprises determining a respective score for each one of a plurality of trajectory candidates for the vehicle from a current ego pose to a target ego position. For the each trajectory candidate, one or more adjustment scores are generated, the one or more adjustment scores including at least one of: a first adjustment score indicative of a minimum distance between the vehicle and a given surrounding object of the vehicle as the vehicle moves along the given trajectory candidate; a second adjustment score indicative of a Post-Encroachment Time (PET) for the vehicle and the given surrounding object; and a third adjustment score indicative of a change in a longitudinal acceleration of the vehicle relative to the given surrounding object. The method further comprises determining, based on the respective score and the plurality of adjustment scores, a modified respective score for the given trajectory candidate, ranking the plurality of trajectory candidates according to modified respective scores thereof, thereby generating a ranked list of trajectory candidates and selecting, from the ranked list of trajectory candidates, a top trajectory candidate as being the target trajectory for navigating the vehicle from the current ego pose to the target ego position.

In some implementations of the method, generating the first adjustment score comprises using a first prediction model that has been trained to determine a minimum distance between the vehicle and the given surrounding object as the vehicle moves along the given trajectory candidate.

In some implementations of the method, the first prediction model has been trained to determine a value of a distance cost function, expressed by a following equation:

$$\text{Distance Cost} = e^{-k(min(distance))},$$

where min (distance) is the minimum distance between the vehicle and the given surrounding object as the vehicle moves along the given trajectory candidate; and k is a coefficient.

In some implementations of the method, generating the second adjustment score comprises using a second prediction model that has been trained to determine PETs for those ones of the plurality trajectory candidates of the vehicle that are intersected by an object trajectory of the given surrounding object.

In some implementations of the method, the second prediction model has been trained to determine a value of a PET cost function, expressed by a following equation:

$$PET\ \text{Cost} = (PET - \text{desired } PET)^2,$$

where PET is a given PET for the given trajectory candidate of the vehicle; and desired PET is a predetermined PET threshold value.

In some implementations of the method, generating the third adjustment score comprises using a third prediction model that has been trained to determine motion parameters of the vehicle causing the change in the longitudinal acceleration of the vehicle and relative to the given surrounding object.

In some implementations of the method, the third prediction model has been trained to determine a value of a follow cost function, expressed by a following equation:

$$\text{Follow Cost} = \sum_{k=1}^{n} (a_k - \text{follow\_accel})^2,$$

where $a_k$ is a longitudinal acceleration value of the vehicle at a $k^{th}$ point defining the given trajectory candidate;

n is a total number of points defining the given trajectory candidate; and follow_accel is a desired longitudinal acceleration of the vehicle relative to the given surrounding object.

In some implementations of the method, the given surrounding object moves immediately ahead of the vehicle, and the method further comprises determining the desired longitudinal acceleration according to a following equation:

$$\text{follow\_accel} = kd(d - d_0 - v_2 t) + kv(v_2 - v_1),$$

where $v_1$ is a vehicle velocity of the vehicle at a $k^{th}$ point defining the given trajectory candidate;

$v_2$ is an object current velocity of the given surrounding object while the vehicle is at the $k^{th}$ point defining the given trajectory candidate;

d is a current distance between the vehicle and the given surrounding object while the vehicle is at the $k^{th}$ point defining the given trajectory candidate;

kd, kv, $d_0$ are constants; and t is time.

In some implementations of the method, generating the first adjustment score comprises using a first prediction model that has been trained to determine a minimum distance between the vehicle and the given surrounding object as the vehicle moves along the given trajectory candidate; generating the second adjustment score comprises using a second prediction model that has been trained to determine PETs for those ones of the plurality trajectory candidates of the vehicle that are intersected by an object trajectory of the given surrounding object; and generating the third adjustment score comprises using a third prediction model that has been trained to determine motion parameters of the vehicle causing the change in the longitudinal acceleration of the vehicle relative to the given surrounding object.

In some implementations of the method, the determining the modified respective score for the given trajectory candidate further comprises determining an average adjustment score of the plurality of adjustment scores of the given trajectory candidate.

In some implementations of the method, the determining the modified respective score for the given trajectory candidate comprises multiplying the respective score thereof by a following multiplier:

$$(1+\text{average auxiliary score})^{-1},$$

where average adjustment score is the average adjustment score of the plurality of adjustment scores.

In some implementations of the method, each one of the first, second, and third prediction models has been trained independently.

In some implementations of the method, each one of the first, second, and third prediction models is a Multilayer Perceptron prediction model.

In some implementations of the method, the given surrounding object comprises a plurality of surrounding objects; and wherein: the first adjustment score is indicative of a minimum distance between the vehicle and a first surrounding object of the plurality of surrounding objects as the vehicle moves along the given trajectory candidate; the second adjustment score is indicative of a PET for the vehicle and a second surrounding object of the plurality of surrounding objects; and the third adjustment score is indicative of a change in a longitudinal acceleration of the vehicle relative to a third surrounding object of the plurality of surrounding objects as the third surrounding object moves immediately ahead of the vehicle.

In accordance with a second broad aspect of the present technology, there is provided an electronic device for determining a target trajectory for a vehicle according to any of the methods described herein. The electronic device comprises at least processor and at least one non-transitory computer-readable memory storing instructions, which, when executed by the at least one processor, cause the electronic device to: determine a respective score for each one of a plurality of trajectory candidates for the vehicle from a current ego pose to a target ego position; for each trajectory candidate, generate one or more adjustment scores, the one or more adjustment scores including at least one of: a first adjustment score indicative of a minimum distance between the vehicle and a given surrounding object of the vehicle as the vehicle moves along the given trajectory candidate; a second adjustment score indicative of a Post-Encroachment Time (PET) for the vehicle and the given surrounding object; and a third adjustment score indicative of a change in a longitudinal acceleration of the vehicle relative to the given surrounding object; determine, based on the respective score and the plurality of adjustment scores, a modified respective score for each trajectory candidate; rank the plurality of trajectory candidates according to the modified respective scores; and select, from the ranked trajectory candidates, a top trajectory candidate as being the target trajectory for navigating the vehicle from the current ego pose to the target ego position.

In some implementations of the electronic device, to generate the first adjustment score, the at least one processor causes the electronic device to use a first prediction model that has been trained to determine a minimum distance between the vehicle and the given surrounding object as the vehicle moves along the given trajectory candidate.

In some implementations of the electronic device, the first prediction model has been trained to determine a value of a distance cost function, expressed by a following equation:

$$\text{Distance Cost} = e^{-k(min(distance))},$$

where min (distance) is the minimum distance between the vehicle and the given surrounding object as the vehicle moves along the given trajectory candidate; and k is a coefficient.

In some implementations of the electronic device, to generate the second adjustment score, the at least one processor causes the electronic device to use a second prediction model that has been trained to determine PETs for those ones of the plurality trajectory candidates of the vehicle that are intersected by an object trajectory of the given surrounding object.

In some implementations of the electronic device, the second prediction model has been trained to determine a value of a PET cost function, expressed by a following equation:

$$PET\ \text{Cost} = (PET - \text{desired}\ PET)^2,$$

where PET is a given PET for the given trajectory candidate of the vehicle; and desired PET is a predetermined PET threshold value.

In some implementations of the electronic device, to generate the third adjustment score, the at least one processor causes the electronic device to use a third prediction model that has been trained to determine motion parameters of the vehicle causing the change in the longitudinal acceleration of the vehicle relative to the given surrounding object.

In accordance with a third broad aspect of the present technology, there is provided a non-transient computer readable medium storing executable instructions for causing at least one computer processor to: determine a respective score for each one of a plurality of trajectory candidates for the vehicle from a current ego pose to a target ego position; for each trajectory candidate, generate one or more adjustment scores, the one or more adjustment scores including at least one of: a first adjustment score indicative of a minimum distance between the vehicle and a given surrounding object of the vehicle as the vehicle moves along the given trajectory candidate; a second adjustment score indicative of a Post-Encroachment Time (PET) for the vehicle and the given surrounding object; and a third adjustment score indicative of a change in a longitudinal acceleration of the vehicle relative to the given surrounding object; determine, based on the respective score and the plurality of adjustment scores, a modified respective score for each trajectory candidate; rank the plurality of trajectory candidates according to the modified respective scores; and select, from the ranked trajectory candidates, a top trajectory candidate as being the target trajectory for navigating the vehicle from the current ego pose to the target ego position.

In the context of the present specification, a “server” is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein. It is contemplated that the user device and the server can be implemented as a same single entity.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context), firmware, hardware, or a combination thereof, that is both necessary and sufficient to achieve the specific function(s) being referenced.

In the context of the present specification, the expression "computer usable information storage medium" or "computer-readable medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "data domain" denotes broadly a collection of values that a data element may include in a particular setting. For example, if the data is image data, such as a 2D image or a 3D point cloud, the data domain may refer to a range of values a given pixel of the 2D image or a given point of the 3D point cloud may have, for example, in a given geographical location (such as a street, a district, a city, a country, and the like), in a given weather condition (such as cloudy, rainy, sunny, and the like), or a combination of both. In another example, the data domain may refer to a range of values the given pixel or the given point may have in a respective one of the 2D image and the 3D point cloud having been generated by a particular image sensor. In other words, in the context of the present specification, 3D point clouds generated by different LiDAR sensors are of different data domains.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
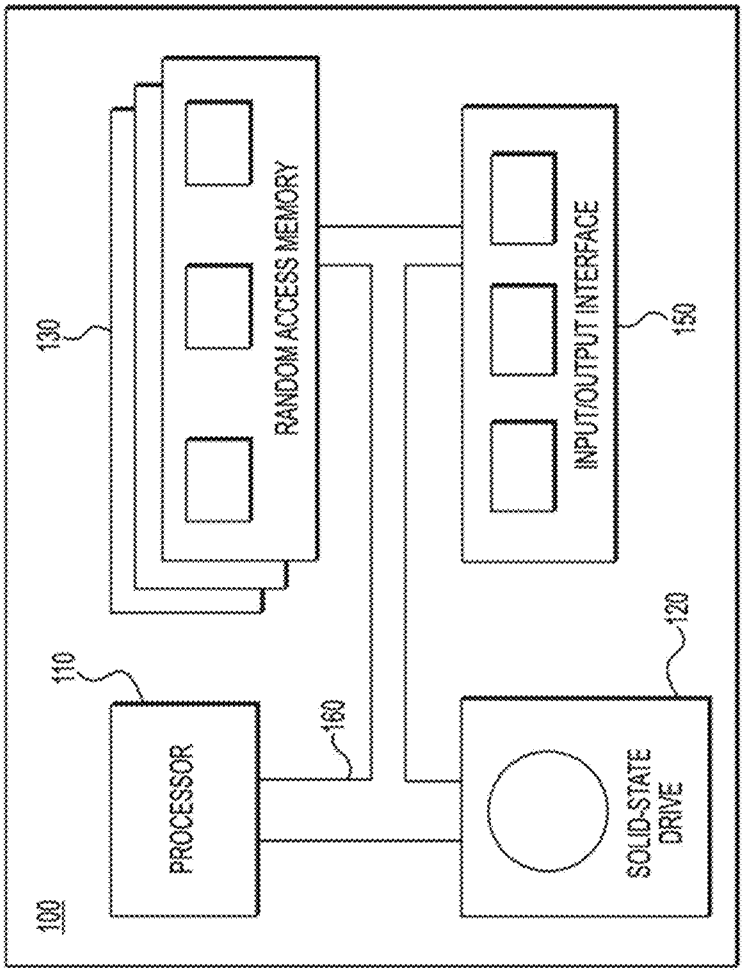
FIG. 1 depicts a schematic diagram of a computer system that can be used for implementing certain non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagram herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labelled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Computing Environment

FIG. 1 illustrates a diagram of a computing environment 100 in accordance with an embodiment of the present technology. In some embodiments, the computing environment 100 may be implemented by any of, for example, a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random-access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

End-to-end Motion Planner

Figure 3:
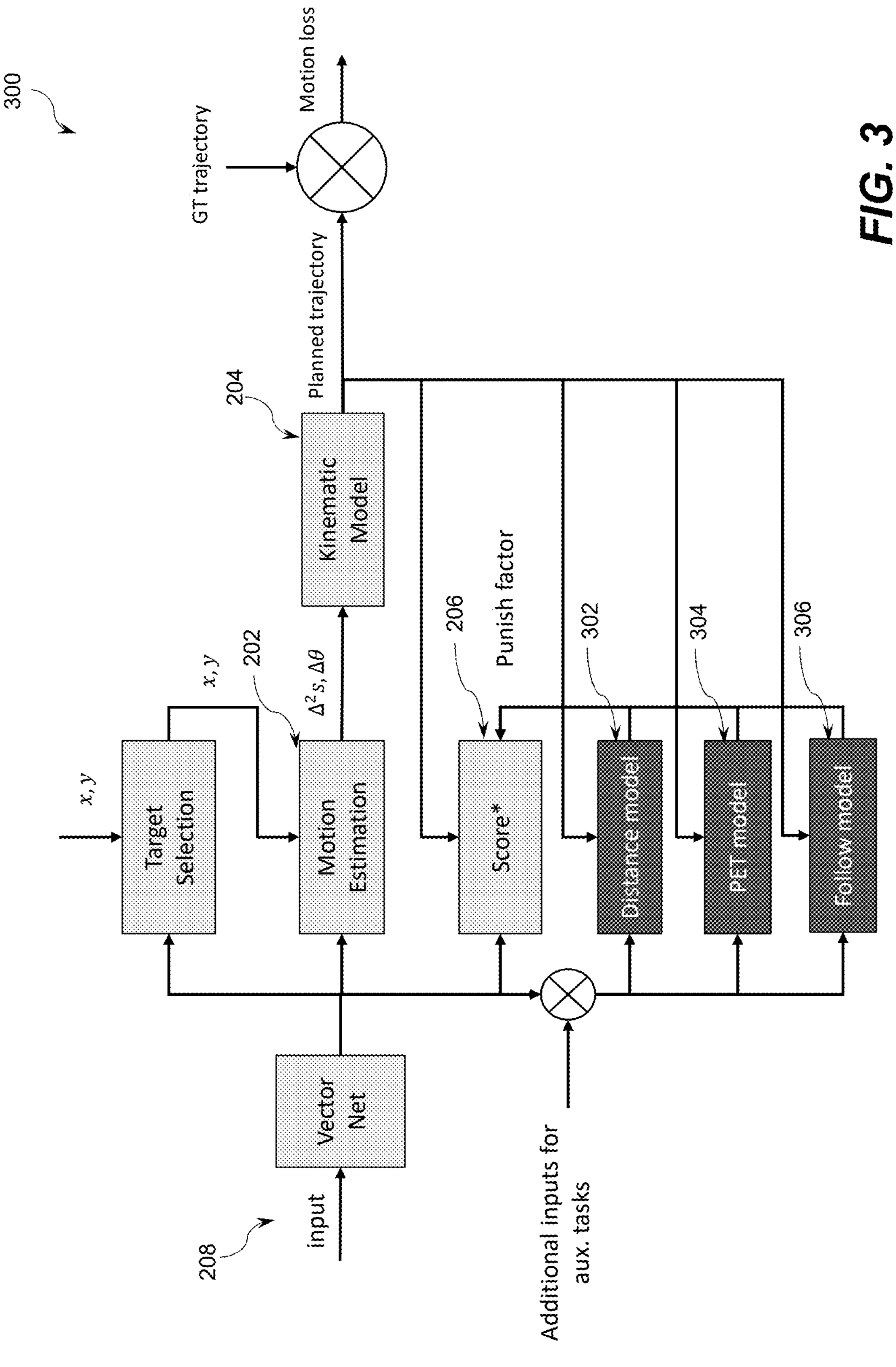
FIG. 3 depicts a schematic illustration of an end-to-end motion planner, in accordance with certain non-limiting embodiments of the present technology.

With reference to FIG. 3, there is depicted a schematic diagram of an architecture of an end-to-end motion planner 300, in accordance with certain non-limiting embodiments of the present technology.

According to certain non-limiting embodiments of the present technology, the end-to-end motion planner 300 can be executed by a server (not separately depicted) communicatively coupled to an electronic device of the vehicle. In some embodiments of the present technology, the server is implemented as a computer server and could thus include some or all of the components of the computing environment 100 of FIG. 1. In one non-limiting example, the server is implemented as a Dell™ PowerEdge™ Server running the Microsoft™ Windows Server™ operating system, but can also be implemented in any other suitable hardware, software, and/or firmware, or a combination thereof. In some non-limiting embodiments of the present technology, the server can be a single server. In alternative non-limiting embodiments of the present technology, the functionality of the server may be distributed and may be implemented via multiple servers.

In some non-limiting embodiments of the present technology, the end-to-end motion planner 300 can be executed by the electronic device of the vehicle. In at least some non-limiting embodiments of the present technology, the electronic device is communicatively coupled to control systems of the vehicle. The electronic device could be arranged and configured to control different operations systems of the vehicle in accordance with a target trajectory, including but not limited to: an ECU (engine control unit), steering systems, braking systems, and signaling and illumination systems (i.e. headlights, brake lights, and/or turn signals). The electronic device associated with the vehicle can include some or all of the components of the computing environment 100 of FIG. 1. In these embodiments, the vehicle can be a self-driving vehicle.

Figure 2:
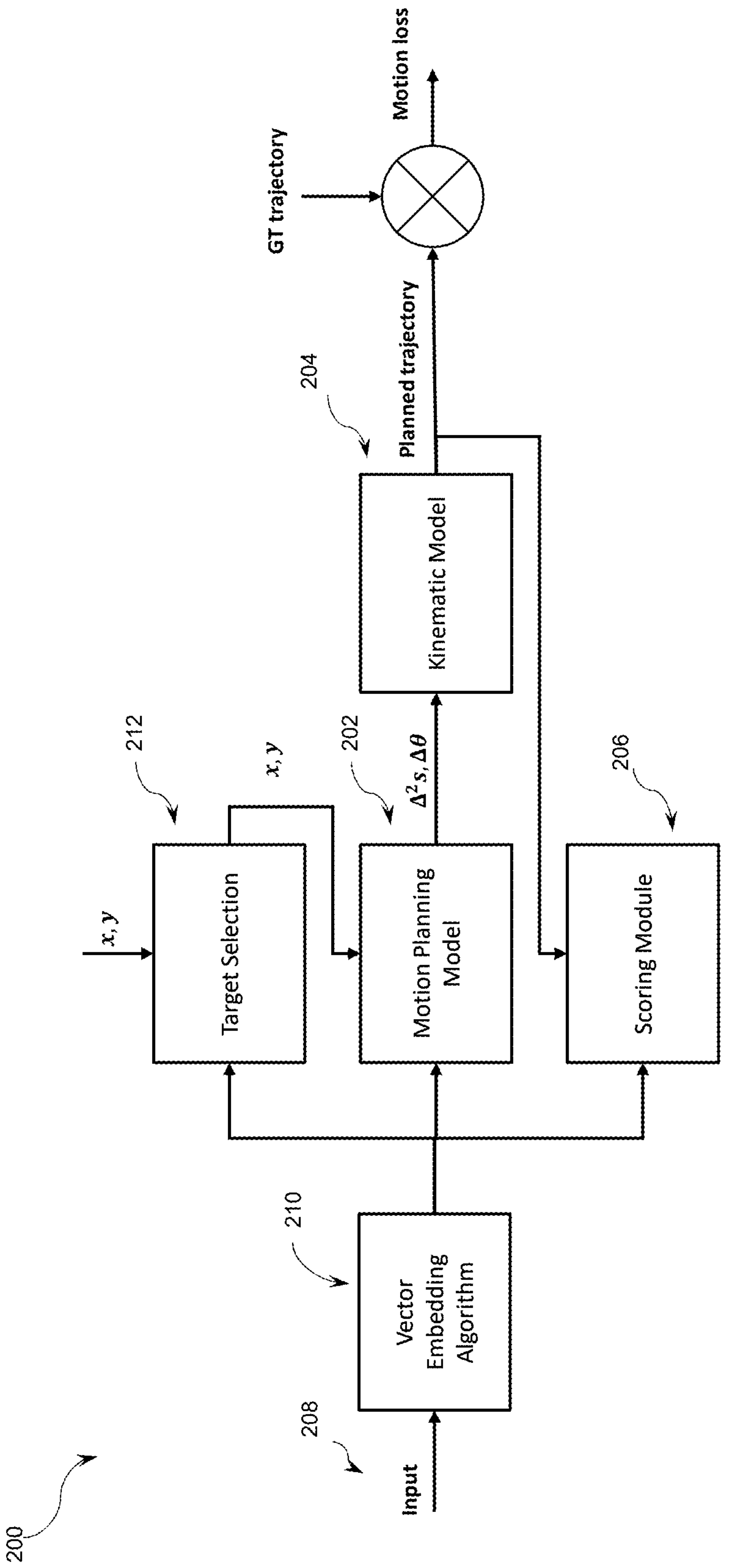
FIG. 2 depicts a schematic diagram of a prior art end-to-end motion planner configured to generate and score trajectory candidates for a vehicle.

According to certain non-limiting embodiments of the present technology, the end-to-end motion planner 300 is different from the end-to-end motion planner 200 of FIG. 2 in that the end-to-end motion planner 300 further includes a distance model 302, a PET model 304 and a follow model 306. In some embodiments, the end-to-end motion planner 300 can be configured to apply a plurality of adjustment scores to a respective score generated by the scoring model 206 for a given trajectory candidate, thereby generating for the given trajectory candidate a modified respective score. Further, based on the modified respective scores, the end-to-end motion planner 300 can be configured to rank the plurality of trajectory candidates for further selection of the target trajectory for navigating the vehicle.

According to certain non-limiting embodiments of the present technology, a server training the end-to-end motion planner 300 can be configured to train each one of the motion planning, kinematic, and scoring models 202, 204, and 206 jointly. To do so, according to certain non-limiting embodiments of the present technology, the server can be configured to generate a training set of data including a plurality of training digital objects, a given one of which includes: (i) training input data, which, akin to the input data 208 mentioned above, can include a training current ego pose of a given training vehicle, data representative of surroundings of the given training vehicle when at the training current ego pose, and data of at least one preceding ego poses of the given training vehicle; (ii) a training target ego position for the given training vehicle; and (iii) a respective label including a ground-truth trajectory for the given training vehicle from the training current ego pose to the training target ego position. For example, the server can be configured to generate the training set of data based on past sensed data, including data of the past trajectories of the vehicle and past surroundings of the given training vehicle, generated by an imaging system of the given training vehicle. As it can be appreciated, the given training vehicle can be implemented similarly to the vehicle, that is, comprise a semi- or fully autonomous vehicle.

In certain non-limiting embodiments of the present technology, the imaging system of the given training vehicle may be configured to capture Red-Green-Blue (RGB) images or a series thereof. The imaging system may comprise camera sensors such as, but not limited to, Charge-Coupled Device (CCD) or Complementary Metal Oxide Semiconductor (CMOS) sensors and/or digital cameras.

Further, according to certain non-limiting embodiments of the present technology, the imaging system may be configured to convert an optical image into an electronic or digital image and may send captured images to the electronic device of the given training vehicle, which is further configured to transmit this data to the server. In some non-limiting embodiments of the present technology, the imaging system may, for example, be a single-lens camera providing RGB pictures. In these embodiments, the imaging system can be implemented as a camera of a type available from FLIR INTEGRATED IMAGING SOLUTIONS INC., 12051 Riverside Way, Richmond, BC, V6 W 1K7, Canada. It should be expressly understood that the single-lens camera can be implemented in any other suitable equipment.

Further, in other non-limiting embodiments of the present technology, the imaging system comprises depth sensors configured to acquire RGB-Depth (RGBD) pictures. In yet other non-limiting embodiments of the present technology, the imaging system can include a LiDAR system configured for gathering information about surroundings of the given training vehicle. It is expected that a person skilled in the art would understand the functionality of the LiDAR system, but briefly speaking, a light source of the LiDAR system is configured to send out light beams that, after having reflected off one or more surrounding objects in the surroundings of the computer system 10, are scattered back to a receiver of the LiDAR system. The photons that come back to the receiver are collected with a telescope and counted as a function of time. Using the speed of light (~3×10^m/s), the electronic device of the given training vehicle can then calculate how far the photons have traveled (in the round trip). Photons can be scattered back off of many different entities surrounding the given training vehicle.

In a specific non-limiting example, the LiDAR system can be implemented as the LiDAR based sensor that may be of the type available from VELODYNE LiDAR, INC. of 5521 Hellyer Avenue, San Jose, CA 95138, United States of America. It should be expressly understood that the LiDAR system can be implemented in any other suitable equipment.

Other implementations of the imaging system enabling generating 3D point clouds, including, for example, depth sensors, 3D scanners, and other suitable devices are envisioned without departing from the scope of the present technology.

The server training the end-to-end motion planner 300 can be configured to: feed a plurality of training digital objects through the end-to-end motion planner 300, thereby causing it to generate a respective plurality of training trajectory candidates, and minimize a difference between each one of the respective plurality of training trajectory candidates and a respective ground-truth trajectory. The server 320 can be further configured to adjust weights of each one of the motion planning, kinematic, and scoring models 202, 204, and 206, thereby training: (i) the motion planing model 202 to generate trajectory candidates; (ii) the kinematic model 204 to generate motion parameters (such as velocity and acceleration) of the vehicle along each one of the plurality of trajectory candidates; and (iii) the scoring model 206 to score each one of the plurality of trajectory candidates.

According to certain non-limiting embodiments of the present technology, each one of the motion planning, kinematic, and scoring models 202, 204, and 206 can be implemented as, for example, a multilayer perceptron (MLP). However, other implementations of these models, including those where each one of the motion planning, kinematic, scoring models 202, 204, and 206 comprises a different machine-learning model, are also envisioned without departing from the scope of the present technology.

It should also be noted that, in some non-limiting embodiments of the present technology, instead of being trained by a server associated with the end-to-end motion planner 300, each one of the motion planning, kinematic, and scoring 202, 204, and 206 models can be pre-trained, for example, by a third-party server (not depicted).

Once each one of the motion planning, kinematic, and scoring models 202, 204, and 206 of the end-to-end motion planner 300 have been trained, they may be used to generate the plurality of trajectory candidates for the vehicle based on the input data 208 using the motion planning and kinematic models 202, 204, and generate respective scores for each one of the plurality of trajectory candidates using the scoring model 206.

According to certain non-limiting embodiments of the present technology, a trajectory candidate generated by the motion planning and kinematic models 202, 204 is a trajectory defined in time and space domains. In other words, the trajectory candidate is representative of a plurality of future positions of the vehicle from the current ego pose to the target ego position thereof in a coordinate system associated with the vehicle, wherein a given future position of the plurality of future positions of the vehicle is associated with a respective future moment in time, at which the vehicle is to be located the given future position.

More specifically, using the motion planning model 202 of the end-to-end motion planner 300, the electronic device can be configured to generate kinematic increments (such as turn angles and displacements between the plurality of future positions) for the given trajectory candidate. Further, using the kinematic model 204, the electronic device can be configured to determine the kinematic parameters (such as speed, acceleration, and the like) of the vehicle, to be moving along the given trajectory candidate, through integrating the generated kinematic increments.

Further, according to certain non-limiting embodiments of the present technology, the end-to-end motion planner 300 executing on a server executing the end-to-end motion planner 300 or other electronic device of the vehicle can be configured to apply the plurality of adjustment scores to the respective score generated by the scoring model 206 for the given trajectory candidate. This may allow more safety risks to be considered than using ground-truth trajectories alone. In some non-limiting embodiments of the present technology, to determine some of the plurality of adjustment scores, the server or other electronic device of the vehicle can be configured to apply specifically trained machine-learning models, such as a first model 302, a second model 304, and a third model 306.

How the end-to-end motion planner 300 is configured to determine the plurality of adjustment scores, according to certain non-limiting embodiments of the present technology, will now be described.

First Adjustment Score

With continued reference to FIG. 3, according to certain non-limiting embodiments of the present technology, a first adjustment score of the plurality of adjustment scores is representative of whether a minimum distance between the vehicle, travelling along the given trajectory candidate and at least one surrounding object is no shorter than a predetermined distance threshold. To determine the first adjustment score, according to certain non-limiting embodiments of the present technology, the end-to-end motion planner 300 can be configured to use the first model 302. According to certain non-limiting embodiments of the present technology, akin to the motion planning, kinematic, and scoring models 202, 204, and 206, the first model 302 can be implemented based on an MLP.

Figure 4:
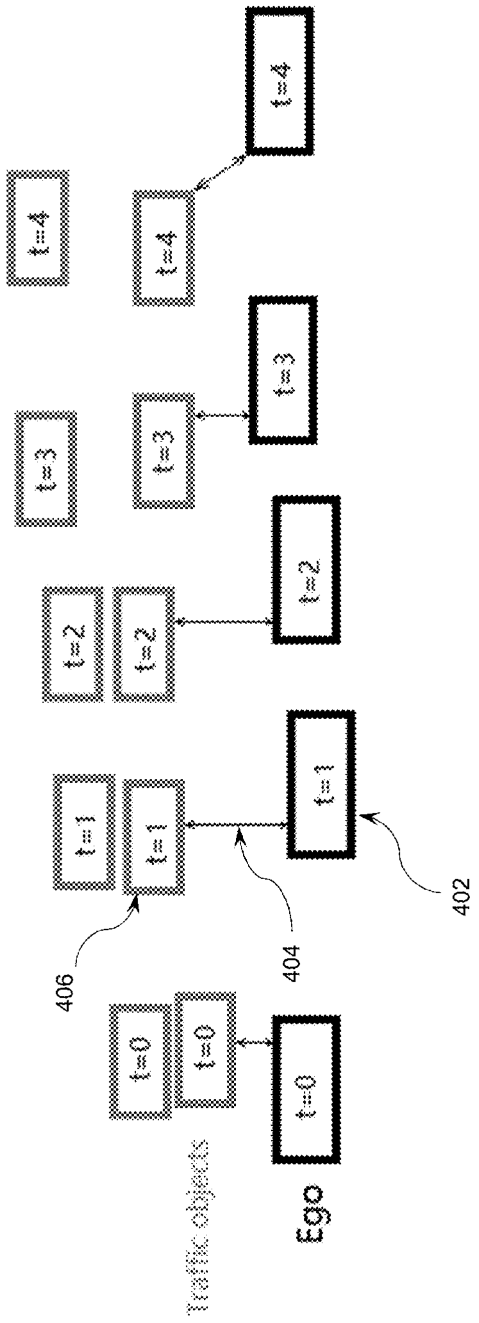
FIG. 4 depicts a schematic diagram of a first training set of data for training a first model to generate a first adjustment score for trajectory candidates generated by the end-to-end motion planner of FIG. 3, in accordance with certain non-limiting embodiments of the present technology.

With reference to FIG. 4, there is depicted a schematic diagram of a first training set of data for training the first model 302 to generate a first adjustment score, in accordance with certain non-limiting embodiments of the present technology. The figure depicts a number of ego poses 402 (i.e. locations of the current training vehicle) and the locations of surrounding objects 406 at various points in time (t).

According to certain non-limiting embodiments of the present technology, the server training the end-to-end motion planner 300 can be configured to train the first model 302 to generate the first adjustment score, which is such that, as the vehicle moves along the given trajectory, the greater the minimum distance between the vehicle and at least one surrounding object, the greater the first adjustment score for the given trajectory candidate is.

To that end, according to certain non-limiting embodiments of the present technology, the server training the end-to-end motion planner 300 can be configured to generate the first training set of data, including a first plurality of training digital objects, each of which includes a training minimum distance 404 between a given training ego pose 402 of the given training vehicle at a given training moment in time (e.g. t=1) and a respective pose 406 of at least one training surrounding object. A given training surrounding object can include, without limitation, another vehicle, a pedestrian, or an immovable object, such as a guardrail, a traffic light, or a tree, as an example. In some non-limiting embodiments of the present technology, the server training the end-to-end motion planner 300 can be configured to generate the first training set of data based on the past sensed data generated by the imaging system of the given training vehicle as mentioned above with respect to the training of the motion planning, kinematic, and scoring models 202, 204, and 206.

Using the first training data set, the server training the end-to-end motion planner 300 can be configured to train the first model 302 to determine values of a distance cost function, which, in some non-limiting embodiments of the present technology, is expressed by a following equation:

$$\text{Distance Cost} = e^{-k(min(distance))}, \tag{1}$$

where min (distance) is the minimum distance between the vehicle and the at least one surrounding object as the vehicle moves along the given trajectory candidate; and k is a coefficient.

In some non-limiting embodiments of the present technology, k can be 5. Thus, as the minimum distance between the vehicle and the at least one surrounding object is approaching zero, which may be indicative of a collision between the vehicle and the at least one surrounding object, the value of the first cost function grows. Using predetermined distance thresholds other than zero is also envisioned.

Further, the end-to-end motion planner 300 can be configured to use the determined value of the distance loss function as the first adjustment score for further use in scoring the plurality of trajectory candidates, as will be described below.

Thus, by using the first adjustment score, a server can be configured to train the end-to-end planner 300 to pay attention to surrounding objects of the vehicle as the vehicle travels along each one of the plurality of trajectory candidates and keep positive distances between the vehicle and the surrounding objects.

Second Adjustment Score

According to certain non-limiting embodiments of the present technology, the end-to-end motion planner 300 can be configured to determine a second adjustment score of the plurality of adjustment scores such that the smaller a Post-Encroachment Time (PET) is for the vehicle, travelling along the given trajectory candidate, the greater the second adjustment score for the given trajectory candidate is.

Figure 5:
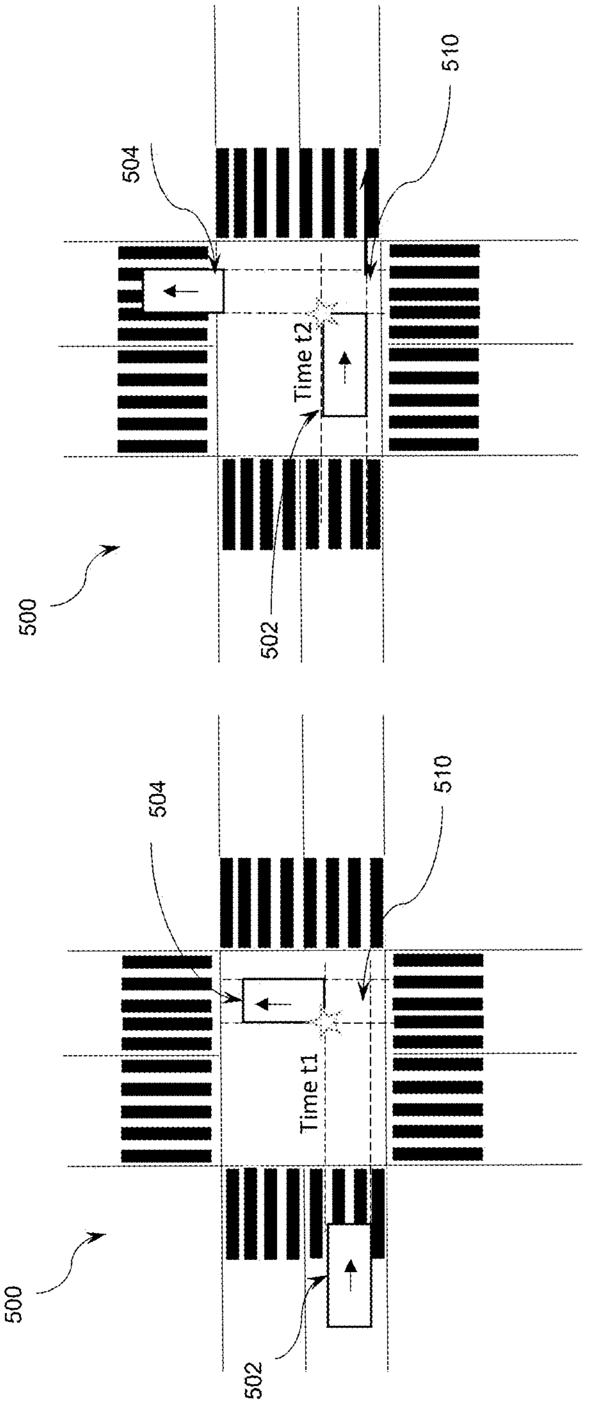
FIG. 5 depicts a schematic diagram of determining a Post-Encroachment Time (PET) for two objects, trajectories of which intersect within a given conflict area, for generating a second training set of data for training a second model to generate a second adjustment score for trajectory candidates generated by the end-to-end motion planner of FIG. 3, in accordance with certain non-limiting embodiments of the present technology.

With reference to FIG. 5, there is depicted a schematic diagram of a road section 500 at first and second moments in time $t_1$ and $t_2$ for determining the PET for a first object 502 and a second object 504, in accordance withe certain non-limiting embodiments of the present technology.

As it can be appreciated, the first and second objects 502, 504 (which are vehicles in the illustrated example) are travelling within the road section 500 along their respective trajectories in the directions indicated with arrows. In a conflict zone 510, the trajectories of the first and second objects 502, 504 intersect. In the context of the present specification, the term "conflict zone" denotes an area that can be traversed simultaneously by multiple objects, such as by the first and second objects 502, 504. Further, in the context of the present specification, the PET for the first and second object 502, 504 is a period between the first moment in time $t_1$ of the second object 504 leaving the conflict zone 510 and the second moment in time $t_2$ of the first object 502 entering the conflict zone 510. In other words, $PET=|t_1-t_2|$.

By considering the second adjustment score when ranking the plurality of candidate trajectories, the end-to-end motion planner 300 can be configured to identify the surrounding objects that are on a critical path relative to ego poses of the vehicle along the given trajectory candidate.

With reference back to FIG. 3, according to certain non-limiting embodiments of the present technology, the end-to-end motion planner 300 can be configured to determine the second adjustment score using the second model 304. According to certain non-limiting embodiments of the present technology, the second model 304 can also be implemented as an MLP.

To train the second model 304 to generate the second adjustment score, the server training the end-to-end motion planner 300 can be configured to generate a second training set of data including a second plurality of training digital objects, each of which includes training PETs of the vehicle along each one of the respective plurality of training trajectory candidates. In some non-limiting embodiments of the present technology, the server can be configured to generate the second training set of data based on the past sensed data generated by the imaging system of the given training vehicle. Also, in some non-limiting embodiments of the present technology, for calculating the training PETs to train the second model 304, the server could be configured to acquire past object trajectories (including their curvature and kinematic parameters) of the surrounding object of the vehicle along each one of the plurality of training trajectory candidates.

Further, using the second training set of data, the server training the end-to-end motion planner 300 can be configured to train the second model 304 to determine a value of a PET cost function for the given trajectory candidate of the vehicle, which, in some non-limiting embodiments of the present technology, can be expressed by a following equation:

$$PET\ \text{Cost} = (PET - \text{desired}\ PET)^2, \quad (2)$$

where PET is a given PET for the given trajectory candidate of the vehicle; and desired PET is a predetermined PET threshold value.

For example, in some non-limiting embodiments of the present technology, the predetermined PET threshold value can be selected to be 1.5 sec. Thus, by training the second model 304, the end-to-end motion planner 300 can be configured to learn the time difference between ego poses of the vehicle along the given trajectory candidate and other surrounding objects passing the same (or close) points, to avoid safety-critical cases (collision, or near-miss). Further, the end-to-end motion planner 300 can be configured to use the respective value of the PET cost function as the second adjustment score for the given trajectory candidate.

Third Adjustment Score

According to certain non-limiting embodiments of the present technology, the end-to-end motion planner 300 can be configured to determine a third adjustment score of the plurality of adjustment scores such that the more a current follow behavior of the vehicle, travelling along the given trajectory candidate, with at least one surrounding object moving immediately ahead of the vehicle deviates from a desired follow behavior, the greater the third adjustment score is. In the context of the present specification, the term "follow behavior" denotes a current driving behavior of a given object with respect to an other object, moving immediately before the given object, including, without limitation, one of: tailgating the other object, adjusting motion parameters to be at a predetermined (which can be selected as being "safe") distance from the other object, or being more than the predetermined distance away from the other object.

According to certain non-limiting embodiments of the present technology, the third adjustment score is representative of a change in a relative acceleration between the vehicle and a surrounding object moving immediately ahead of the vehicle.

With reference back to FIG. 3, according to certain non-limiting embodiments of the present technology, to determine the third adjustment score, the end-to-end motion planner 300 can be configured to use the third model 306. In some non-limiting embodiments of the present technology, akin to the first and second models 302, 304, the third model 306 can be implemented based on an MLP.

Figure 6:
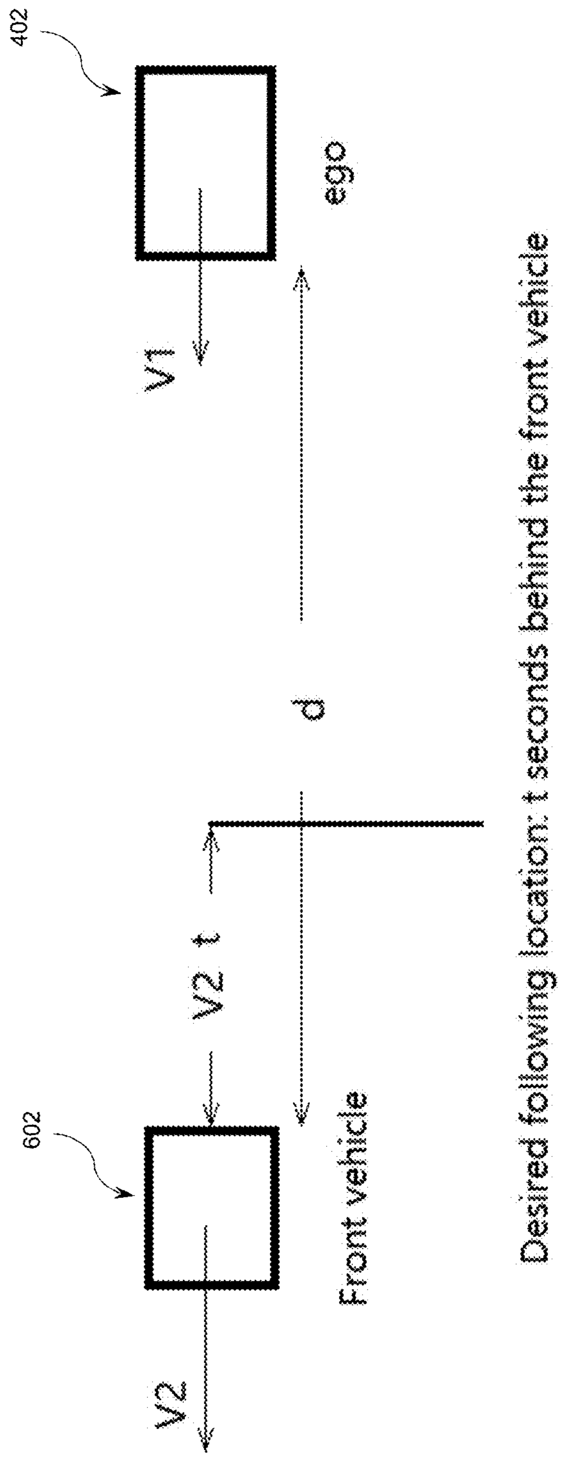
FIG. 6 depicts a schematic diagram of generating a third training set of data for training a third model to generate a third adjustment score for trajectory candidates generated by the end-to-end motion planner of FIG. 3, in accordance with certain non-limiting embodiments of the present technology.

With reference to FIG. 6, there is depicted a schematic diagram of a third training set of data to train the third model 306 to generate the third adjustment score, according to certain non-limiting embodiments of the present technology.

In the illustrated example, at the given training moment in time, the given training vehicle is located at the given training ego pose 402, which is immediately before a front object 602.

According to certain non-limiting embodiments of the present technology, to train the third model 306, the server training the end-to-end motion planner 300 can be configured to generate the third training set of data including a third plurality of training digital objects, a given one of which includes: (i) coordinates of a given point defining the given training trajectory candidate, such as that corresponding to the given training ego pose 402; (ii) a distance between the given training ego pose 402 and the front object 602; (iii) a first velocity of the given training vehicle at the given training ego pose and a second velocity of the front vehicle while the given training vehicle a the given training ego pose; and (iv) a current longitudinal acceleration of the given training vehicle at the given training ego pose 402. In some non-limiting embodiments of the present technology, the server 320 can be configured to generate the third training set of data based on the past sensed data generated by the imaging system of the given training vehicle. In some non-limiting embodiments of the present technology, to generate the third plurality of training digital objects, the server training the end-to-end motion planner 300 could be configured to acquire past object trajectories (including their curvature and kinematic parameters) of objects that at least partially followed each one of the plurality of training trajectory candidates.

Further, using the third training set of data, the server training the end-to-end motion planner 300 can be configured to train the third model 306 to determine values of a follow cost function, which, in some non-limiting embodiments of the present technology, can be expressed by a following equation:

$$\text{Follow Cost} = \sum_{k=1}^{n} (a_k - \text{follow\_accel})^2, \quad (3)$$

where $a_k$ is a longitudinal acceleration value of the vehicle at a $k^{th}$ point defining the given trajectory candidate of the vehicle;

n is a total number of points defining the given trajectory candidate; and follow_accel is a desired longitudinal acceleration of the vehicle before the at least one surrounding object immediately ahead of the vehicle.

In some non-limiting embodiments of the present technology, the server training the end-to-end motion planner 300 can be configured to determine the desired longitudinal acceleration at the $k^{th}$ point of the given trajectory candidate in accordance with a following equation:

$$\text{follow\_accel} = kd(d - d_0 - v_2 t) + kv(v_2 - v_1), \quad (4)$$

where $v_1$ is a vehicle velocity of the vehicle at the $k^{th}$ point of the given trajectory candidate;

$v_2$ is an object current velocity of the at least one surrounding object immediately ahead of the vehicle while the vehicle is at the $k^{th}$ point of the given trajectory candidate;

d is a distance between the vehicle and the at least one surrounding object immediately ahead of the vehicle while the vehicle is at the $k^{th}$ point of the given trajectory candidate;

kd, kv, $d_0$ are constants; and t is time.

In some non-limiting embodiments of the present technology, kd=0.03, kv=0.3, t=1.5, and $d_0$=3.0.

Further, the end-to-end motion planner 300 can be configured to determine the third adjustment score for the given candidate trajectory as the respective value of the follow cost function defined above. By using the third adjustment score, the end-to-end motion planner 300 can be configured to adjust a current longitudinal profile of the vehicle to a desired longitudinal profile, along the given trajectory candidate, maintaining a constant time time spacing between the current ego pose of the vehicle and the immediate front object.

According to certain non-limiting embodiments of the present technology, the server training the end-to-end motion planner 300 can be configured to train each one of the first, second, and third models 302, 304, and 306 independently of each other. In other words, the server can be configured to train each one of the first, second, and third models 302, 304, and 306 for its respective target separately.

In some non-limiting embodiments of the present technology, after training the end-to-end motion planner 300, including the first, second, and third models 302, 304, and 306, as described above, a server training the end-to-end motion planner 300 can be configured to transmit the end-to-end motion planner 300 to an electronic device associated with the vehicle for further use in determining the target trajectory for navigating the vehicle. In other non-limiting embodiments of the present technology, a server executing the end-to-end motion planner 300 can be configured to determine the target trajectory for the vehicle and further transmit data representative thereof to the electronic device associated with the vehicle for further use in navigating the vehicle.

More specifically, in some non-limiting embodiments of the present technology, the electronic device of the vehicle, executing the end-to-end motion planner 300 trained as described above, can be configured to: (i) acquire the input data 208 representative of the current ego pose of the vehicle and the surroundings thereof; (ii) acquire the data of the target ego position for the vehicle; (iii) generate, using the motion planning and kinematic models 202, 204, the plurality of trajectory candidates; (iv) generate, using the scoring model 206, the respective score for the given trajectory candidate of the plurality of trajectory candidates; and (v) generate for the given trajectory candidate the plurality of adjustment scores, such the first, second, and third adjustment scores. For example, to generate the first, second, and third adjustment scores, the electronic device can be configured to use the first, second, and third models 302, 304, and 306, respectively.

Further, according to certain non-limiting embodiments of the present technology, the electronic device of the vehicle can be configured to combine the respective score generated by the scoring model 206 and the plurality of adjustment scores for the given trajectory candidate, thereby generating the modified respective score for the given trajectory candidate. In some non-limiting embodiments of the present technology, the electronic device can be configured to deduct each one of the plurality of adjustment scores from the respective score generated by the scoring model 206.

In other non-limiting embodiments of the present technology, to combine the respective score generated by the scoring model 206 and the plurality of adjustment scores for the given trajectory candidate, the electronic device can be configured to determine an average value of the plurality of adjustment scores for the given trajectory candidate. In a specific non-limiting example, the electronic device can be configured to determine the modified respective score for the given trajectory by multiplying the respective score thereof, generated by the scoring model 206, by a following multiplier:

$$(1+\text{average auxiliary score})^{-1}, \qquad (5)$$

where average adjustment score is the average value of the plurality of adjustment scores.

Further, the electronic device can be configured to: (i) rank the plurality of trajectory candidates in accordance with their modified respective scores, thereby generating a ranked list of trajectory candidates; and (ii) select, from ranked list of trajectory candidates, a top-ranked trajectory candidate as being the target trajectory for navigating the vehicle.

Thus, the present methods and systems, via applying the plurality of adjustment scores mentioned above, may allow addressing the problem of causal confusion, thereby increasing safety of the target trajectories.

Computer-Implemented Method

Figure 7:
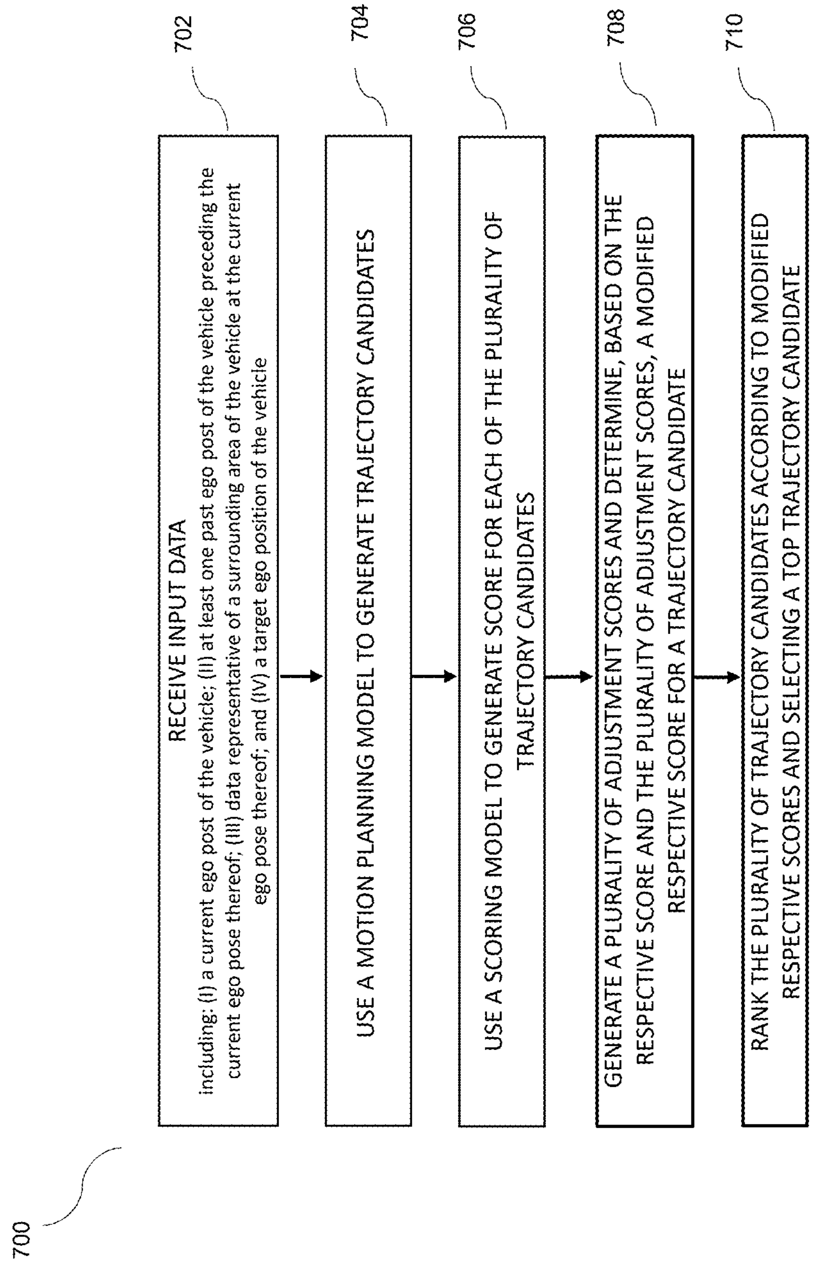
FIG. 7 depicts a flowchart diagram of a method for determining a target trajectory for the vehicle, in accordance with certain non-limiting embodiments of the present technology.

Given the examples and architecture described above, it is possible to implement a method for determining the target trajectory for the vehicle. With reference to FIG. 7, there is depicted a flowchart diagram of a method 700, in accordance with certain non-limiting embodiments of the present technology. In some non-limiting embodiments of the present technology, the method 700 can be executed by the server described above. In other non-limiting embodiments of the present technology, the method 700 can be executed by the electronic device associated with the vehicle.

Step 702: Receiving Input Data

The method 700 commences at step 702 with the processor of the electronic device of the vehicle being configured to receive the input data 208 for determining the target trajectory for the vehicle. According to certain non-limiting embodiments of the present technology, the input data 208 may include one or more of: the current ego pose of the vehicle, the history motion information and the information of the vehicle's surroundings. Further, according to certain non-limiting embodiments of the present technology, the electronic device can be configured to receive the target ego position for the vehicle. In other words, the input data may include: (I) a current ego post of the vehicle; (II) at least one past ego post of the vehicle preceding the current ego pose thereof; (III) data representative of a surrounding area of the vehicle at the current ego pose thereof; and (IV) a target ego position of the vehicle.

Step 704: Using a Motion Planning Model to Generate Trajectory Candidates

Further, at step 704, according to certain non-limiting embodiments of the present technology, based on the input data 208 and the received target ego position, using the end-to-end motion planner 300, the electronic device can be configured to generate the plurality of trajectory candidates for the vehicle from the current ego pose to target ego position thereof.

More specifically, using the motion planning model and kinematic models 202 of the end-to-end motion planner 300, the electronic device can be configured to generate kinematic increments (such as turn angles and displacements between the plurality of future positions) for the given trajectory candidate. Further, using the kinematic model 204, the electronic device can be configured to determine the kinematic parameters (such as speed, acceleration, and the like) of the vehicle, to be moving along the given trajectory candidate, through integrating the generated kinematic increments.

Step 706: Generating a Respective Score for Each One of the Plurality of Trajectory Candidates Further, using the scoring model 206 of the end-to-end motion planner 300, the electronic device can be configured to generate, for the given trajectory candidate of the plurality of trajectory candidates, the respective score.

As mentioned above, according to certain non-limiting embodiments of the present technology, the scoring model 206 could be trained by a server training the end-to-end motion planner 300 to generate scores for trajectories by minimizing differences between the training trajectory candidates and the ground-truth trajectory, which the vehicle is currently following.

Step 708: Generating a Plurality of Adjustment Scores and Determining, Based on the Respective Score and the Plurality of Adjustment Scores, a Modified Respective Score for a Trajectory Candidate At step 708, as described in detail above with reference to FIGS. 3 to 6, according to certain non-limiting embodiments of the present technology, the electronic device of the vehicle can be configured to generate, for the given trajectory candidate, a plurality of adjustment scores, such as the first, second, and third adjustment scores as described above.

More specifically, in some non-limiting embodiments of the present technology, the electronic device can be configured to determine the first adjustment score by using the first model 302 that has been trained to determine values of the distance cost function, expressed by Equation (1). Further, in some non-limiting embodiments of the present technology, the electronic device can be configured to determine the second adjustment score by using the second model 304 that has been trained to determine values of the PET cost function, expressed by Equation (2). Finally, in some non-limiting embodiments of the present technology, the electronic device can be configured to determine the third adjustment score by using the third model 306 that has been trained to determine values of the follow cost function, expressed by Equation (3).

Further, the electronic device can be configured to combine the respective score generated by the scoring model 206 and the plurality of adjustment scores for the given trajectory candidate, thereby determining the modified respective score for the given trajectory candidate. In a specific non-limiting example, the electronic device can be configured to determine the modified respective score for the given trajectory by multiplying the respective score thereof, generated by the scoring model 206, by the multiplier expressed by Equation (5).

Step 710: Ranking the Plurality of Trajectory Candidates According to Modified Respective Scores and Selecting a Top Trajectory Candidate.

At step 710, according to certain non-limiting embodiments of the present technology, the electronic device can be configured to: (i) rank the plurality of trajectory candidates in accordance with their modified respective scores, thereby generating the ranked list of trajectory candidates; and (ii) select, from the ranked list of trajectory candidates, a top-ranked trajectory candidate as being the target trajectory for navigating the vehicle from the current ego pose to the target ego position.

Thus, certain embodiments of the method 700, by considering the adjustment scores, may allow addressing the problem of causal confusion, thereby increasing the safety of the determined trajectories.

It should be expressly understood that not all technical effects mentioned herein need to be enjoyed in each and every embodiment of the present technology.

In this application, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present application.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In this application, "at least one" means one or more, and "a plurality of" means two or more. "and/or" describes an association relationship of associated objects, and indicates that there may be three relationships. For example, A and/or B may indicate cases includes "only A", "both A and B", and "only B", where A and B may be singular or plural. The character "/" generally indicates that the associated objects are in an OR relationship. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). For example, "at least one of the following items" or a similar expression thereof refers to any combination of these items, including any combination of a single item or a plurality of items. For example, "at least one of a, b, or c" may represent a, b, c, "a and b", "a and c", "b and c", or "a, b and c", where a, b, and c may be a single or multiple form.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining a target trajectory for a vehicle, the method being executable by at least one hardware processor of an electronic device associated with the vehicle, the method comprising:

determining a respective score for each one of a plurality of trajectory candidates for the vehicle from a current ego pose to a target ego position;

for each trajectory candidate, generating a plurality of adjustment scores, the plurality of adjustment scores comprising:

a first adjustment score indicative of a minimum distance between the vehicle and a given surrounding object of the vehicle as the vehicle moves along the given trajectory candidate; and at least one of:

a second adjustment score indicative of a Post-Encroachment Time (PET) for the vehicle and the given surrounding object; and a third adjustment score indicative of a change in a longitudinal acceleration of the vehicle relative to the given surrounding object;

determining, based on the respective score and the plurality of adjustment scores, a modified respective score for each trajectory candidate;

ranking the plurality of trajectory candidates according to the modified respective scores;

selecting, from the ranked trajectory candidates, a top trajectory candidate as being the target trajectory for navigating the vehicle from the current ego pose to the target ego position;

generating one or more vehicle control commands based on the target trajectory; and controlling at least one of a steering system, braking system, or engine control unit (ECU) of the vehicle to navigate the vehicle according to the vehicle control commands, thereby navigating the vehicle according to the target trajectory.

2. The method of claim 1, wherein generating the first adjustment score comprises using a first prediction model that has been trained to determine a minimum distance between the vehicle and the given surrounding object as the vehicle moves along the given trajectory candidate.

3. The method of claim 2, wherein the first prediction model has been trained to determine a value of a distance cost function, expressed by a following equation:

$$\text{Distance Cost} = e^{-k(min(distance))},$$

where min (distance) is the minimum distance between the vehicle and the given surrounding object as the vehicle moves along the given trajectory candidate; and k is a coefficient.

4. The method of claim 1, wherein generating the second adjustment score comprises using a second prediction model that has been trained to determine PETs for those ones of the plurality trajectory candidates of the vehicle that are intersected by an object trajectory of the given surrounding object.

5. The method of claim 4, wherein the second prediction model has been trained to determine a value of a PET cost function, expressed by a following equation:

$$PET\ \text{Cost} = (PET - \text{desired } PET)^2,$$

where PET is a given PET for the given trajectory candidate of the vehicle; and desired PET is a predetermined PET threshold value.

6. The method of claim 1, wherein generating the third adjustment score comprises using a third prediction model that has been trained to determine motion parameters of the vehicle causing the change in the longitudinal acceleration of the vehicle and relative to the given surrounding object.

7. The method of claim 6, wherein the third prediction model has been trained to determine a value of a follow cost function, expressed by a following equation:

$$\text{Follow Cost} = \sum_{k=1}^{n} (a_k - \text{follow\_accel})^2,$$

where $a_k$ is a longitudinal acceleration value of the vehicle at a $k^{th}$ point defining the given trajectory candidate;

n is a total number of points defining the given trajectory candidate; and follow accel is a desired longitudinal acceleration of the vehicle relative to the given surrounding object.

8. The method of claim 7, wherein the given surrounding object moves immediately ahead of the vehicle, and wherein the method further comprises determining the desired longitudinal acceleration according to a following equation:

$$\text{follow\_accel} = kd(d - d_0 - v_2 t) + kv(v_2 - v_1),$$

here $v_1$ is a vehicle velocity of the vehicle at a $k^{th}$ point defining the given trajectory candidate;

$v_2$ is an object current velocity of the given surrounding object while the vehicle is at the $k^{th}$ point defining the given trajectory candidate;

d is a current distance between the vehicle and the given surrounding object while the vehicle is at the $k^{th}$ point defining the given trajectory candidate;

kd, kv, $d_0$ are constants; and t is time.

9. The method of claim 1, wherein:

generating the first adjustment score comprises using a first prediction model that has been trained to determine a minimum distance between the vehicle and the given surrounding object as the vehicle moves along the given trajectory candidate;

generating the second adjustment score comprises using a second prediction model that has been trained to determine PETs for those ones of the plurality trajectory candidates of the vehicle that are intersected by an object trajectory of the given surrounding object; and generating the third adjustment score comprises using a third prediction model that has been trained to determine motion parameters of the vehicle causing the change in the longitudinal acceleration of the vehicle relative to the given surrounding object.

10. The method of claim 9, wherein the determining the modified respective score for the given trajectory candidate further comprises determining an average adjustment score of the plurality of adjustment scores of the given trajectory candidate.

11. The method of claim 10, wherein the determining the modified respective score for the given trajectory candidate comprises multiplying the respective score thereof by a following multiplier:

$$(1+\text{average auxiliary score})^{-1},$$

where average adjustment score is the average adjustment score of the plurality of adjustment scores.

12. The method of claim 9, wherein each one of the first, second, and third prediction models has been trained independently.

13. The method of claim 9, wherein each one of the first, second, and third prediction models is a Multilayer Perceptron prediction model.

14. The method of claim 1, wherein the given surrounding object comprises a plurality of surrounding objects; and wherein:

the first adjustment score is indicative of a minimum distance between the vehicle and a first surrounding object of the plurality of surrounding objects as the vehicle moves along the given trajectory candidate;

the second adjustment score is indicative of a PET for the vehicle and a second surrounding object of the plurality of surrounding objects; and the third adjustment score is indicative of a change in a longitudinal acceleration of the vehicle relative to a third surrounding object of the plurality of surrounding objects as the third surrounding object moves immediately ahead of the vehicle.

15. An electronic device for determining a target trajectory for a vehicle, the electronic device comprising at least one hardware processor and at least one non-transitory computer-readable memory storing instructions, which, when executed by the at least one hardware processor, cause the electronic device to:

determine a respective score for each one of a plurality of trajectory candidates for the vehicle from a current ego pose to a target ego position;

for each trajectory candidate, generate a plurality of adjustment scores, the plurality of adjustment scores comprising:

a first adjustment score indicative of a minimum distance between the vehicle and a given surrounding object of the vehicle as the vehicle moves along the given trajectory candidate; and at least one of:

a second adjustment score indicative of a Post-Encroachment Time (PET) for the vehicle and the given surrounding object; and a third adjustment score indicative of a change in a longitudinal acceleration of the vehicle relative to the given surrounding object;

determine, based on the respective score and the plurality of adjustment scores, a modified respective score for each trajectory candidate;

rank the plurality of trajectory candidates according to the modified respective scores; and select, from the ranked trajectory candidates, a top trajectory candidate as being the target trajectory for navigating the vehicle from the current ego pose to the target ego position;

generate one or more vehicle control commands based on the target trajectory; and control at least one of a steering system, braking system, or engine control unit (ECU) of the vehicle to navigate the vehicle according to the vehicle control commands, thereby navigate the vehicle according to the target trajectory.

16. The electronic device of claim 15, wherein to generate the first adjustment score, the at least one hardware processor causes the electronic device to use a first prediction model that has been trained to determine a minimum distance between the vehicle and the given surrounding object as the vehicle moves along the given trajectory candidate.

17. The electronic device of claim 16, wherein the first prediction model has been trained to determine a value of a distance cost function, expressed by a following equation:

$$\text{Distance Cost} = e^{-k(min(distance))},$$

where min (distance) is the minimum distance between the vehicle and the given surrounding object as the vehicle moves along the given trajectory candidate; and k is a coefficient.

18. The electronic device of claim 15, wherein to generate the second adjustment score, the at least one hardware processor causes the electronic device to use a second prediction model that has been trained to determine PETs for those ones of the plurality trajectory candidates of the vehicle that are intersected by an object trajectory of the given surrounding object.

19. The electronic device of claim 18, wherein the second prediction model has been trained to determine a value of a PET cost function, expressed by a following equation:

$$PET\ \text{Cost} = (PET - \text{desired}\ PET)^2,$$

where PET is a given PET for the given trajectory candidate of the vehicle; and desired PET is a predetermined PET threshold value.

20. The electronic device of claim 15, wherein to generate the third adjustment score, the at least one hardware processor causes the electronic device to use a third prediction model that has been trained to determine motion parameters of the vehicle causing the change in the longitudinal acceleration of the vehicle relative to the given surrounding object.

21. A non-transient computer readable medium storing executable instructions for causing at least one hardware processor to:

determine a respective score for each one of a plurality of trajectory candidates for a vehicle from a current ego pose to a target ego position;

for each trajectory candidate, generate a plurality of adjustment scores, the plurality of adjustment scores comprising:

a first adjustment score indicative of a minimum distance between the vehicle and a given surrounding object of the vehicle as the vehicle moves along the given trajectory candidate; and at least one of:

a second adjustment score indicative of a Post-Encroachment Time (PET) for the vehicle and the given surrounding object; and a third adjustment score indicative of a change in a longitudinal acceleration of the vehicle relative to the given surrounding object;

determine, based on the respective score and the plurality of adjustment scores, a modified respective score for each trajectory candidate;

rank the plurality of trajectory candidates according to the modified respective scores; and select, from the ranked trajectory candidates, a top trajectory candidate as being the target trajectory for navigating the vehicle from the current ego pose to the target ego position;

generate one or more vehicle control commands based on the target trajectory; and control at least one of a steering system, braking system, or engine control unit (ECU) of the vehicle to navigate the vehicle according to the vehicle control commands, thereby navigate the vehicle according to the target trajectory.

* * * * *